US007812280B2

(12) United States Patent
Broude et al.

(10) Patent No.: US 7,812,280 B2
(45) Date of Patent: Oct. 12, 2010

(54) METHOD AND APPARATUS FOR LASER MICROMACHINING A CONICAL SURFACE

(75) Inventors: Sergey V. Broude, Newton Center, MA (US); Rong Gu, Hudson, NH (US); David S. Holbrook, Lexington, MA (US); Kenneth T. McDaniel, Merrimack, NH (US); Pascal Miller, Groton, MA (US); David L. Wall, Burlington, MA (US)

(73) Assignee: Resonetics, Inc., Nashua, NH (US)

( * ) Notice: Subject to any disclaimer, the term of this patent is extended or adjusted under 35 U.S.C. 154(b) by 1347 days.

(21) Appl. No.: 11/292,691

(22) Filed: Dec. 2, 2005

(65) Prior Publication Data
US 2006/0144829 A1     Jul. 6, 2006

Related U.S. Application Data

(60) Provisional application No. 60/632,745, filed on Dec. 2, 2004.

(51) Int. Cl.
*B23K 26/38*     (2006.01)
(52) U.S. Cl. ............................. 219/121.68; 219/121.6; 219/121.67; 219/121.75; 219/121.82
(58) Field of Classification Search ............... 219/121.6, 219/121.67, 121.68, 121.73, 121.75, 121.82
See application file for complete search history.

(56) References Cited

U.S. PATENT DOCUMENTS

| | | | |
|---|---|---|---|
| 5,466,908 A * | 11/1995 | Hosoya et al. ......... | 219/121.68 |
| 5,760,366 A * | 6/1998 | Haruta et al. .......... | 219/121.68 |
| 6,008,914 A * | 12/1999 | Sasagawa et al. ............. | 359/15 |
| 6,091,047 A * | 7/2000 | Miyakawa et al. ..... | 219/121.68 |
| 2003/0196996 A1* | 10/2003 | Jennings et al. ........ | 219/121.73 |
| 2004/0223330 A1 | 11/2004 | Broude et al. ............... | 362/268 |

FOREIGN PATENT DOCUMENTS

| EP | 0 575 850 A2 | 12/1993 |
|---|---|---|
| JP | 2001096389 | 4/2001 |

OTHER PUBLICATIONS

Machine Translation of JP 2001-096389.*
International Search Report dated Apr. 12, 2006 corresponding to PCT/US2005/043681 filed Dec. 2, 2005.

* cited by examiner

*Primary Examiner*—Tu B Hoang
*Assistant Examiner*—Brian Jennison
(74) *Attorney, Agent, or Firm*—Mintz, Levin, Cohn, Ferris, Glovsky and Popeo, P.C.

(57) ABSTRACT

Embodiments of the present invention are directed to methods and systems for micromachining a conical surface. In one embodiment, such a system may include a rotating platform for receiving a long line of laser illumination, a mask having a predetermined pattern comprising a sector of a planar ring, the mask being positioned on the rotating platform, a workpiece stage having a rotational axis for rotating a removably-affixed workpiece comprising a conical surface, wherein the sector comprises the planar image of the conical surface, an excimer laser for producing a laser beam, a homogenizer for homogenizing the laser beam in at least a single direction, at least one condenser lens, a turning mirror and at least one projection lens.

18 Claims, 3 Drawing Sheets

METHOD AND APPARATUS FOR LASER MICROMACHINING A CONICAL SURFACE

CLAIM TO PRIORITY

The present applications claims priority under 35 U.S.C. §119(e) of U.S. Provisional Patent Application No. 60/632,745, filed Dec. 2, 2004, the entire disclosure of which is herein incorporated by reference.

FIELD OF THE INVENTION

Embodiments of the present invention are directed to methods, devices and/or systems in the field of micromachining, and more particularly in the field of laser micromachining.

BACKGROUND OF THE INVENTION

Laser micromachining is a method by which material is removed from an object (workpiece) to produce a product, utilizing the laser light energy. The laser light energy enables the material of the workpiece to be ablated via either or both of thermal or chemical action.

Ablating a particular pattern in a workpiece may be accomplished using mask-projection. In mask-projection, laser light is directed upon a mask and the image of it then projected onto the workpiece, irradiating the surface with laser light energy according to the pattern of the mask. The pattern is reproduced on the surface of the workpiece.

Although it may be possible to micromachine non-planar surfaces (e.g., curved surfaces, and the like), such micromachining is difficult to accomplish at higher speeds/throughputs. Generally, only planar surfaces are capable of being micromachined quickly using, for example, a mask-projection system. Thus, it would be an improvement in the existing laser micromachining systems and methods to be able to laser-micromachine conical surfaces (for example) in a high speed and efficient manner.

SUMMARY OF THE INVENTION

Embodiments of the present invention are directed to laser micromachining apparatuses/systems and/or methods thereof. Specifically, some embodiments of the invention include a laser micromachining apparatus for copying an image of a planar mask onto a surface of a conical workpiece. In one embodiment of the invention, this may be accomplished by rotating the mask and the cone synchronously.

Some embodiments of the present invention enable high-speed machining by projecting a long-line of illumination along a conical surface all at once with a large-field imaging lens.

Accordingly, in one embodiment of the invention, a system for micromachining a conical surface is provided and may include a rotating platform for receiving a long line of electromagnetic radiation, a mask having a predetermined pattern comprising a sector of a planar ring, the mask being positioned on the rotating platform and a workpiece stage having a rotational axis for rotating a removably-affixed workpiece. The workpiece may include a conical surface, and the sector comprises the planar image of the conical surface.

In another embodiment of the invention, a method for imaging a conical surface of a workpiece may be provided and may include directing an irradiating beam of electromagnetic radiation at a mask. The mask may include a planar surface of a sector of a ring and a predetermined pattern thereon and the ring sector may correspond to an unwrapped area of a conical surface of a workpiece. The method may further include producing, as a result of the irradiating beam interacting with the mask, an image field for projection on the conical surface of the workpiece, projecting the image field onto the conical surface of the workpiece, rotating the mask about an axis, wherein the axis comprises the center of the ring, and synchronously rotating the conical surface of the workpiece about a second axis, the second axis being the axis of the conical surface.

Embodiments of the present invention are directed to methods and systems for micromachining a conical surface. In one embodiment, such a system may include a rotating platform for receiving a long line of laser illumination, a mask having a predetermined pattern comprising a sector of a planar ring, the mask being positioned on the rotating platform, a workpiece stage having a rotational axis for rotating a removably-affixed workpiece comprising a conical surface, wherein the sector comprises the planar image of the conical surface, an excimer laser for producing a laser beam, a homogenizer for homogenizing the laser beam in at least a single direction, at least one condenser lens, a turning mirror and at least one projection lens.

Still other embodiments of the invention may include computer application programs and computer readable media having an application program and/or computer instructions provided thereon for controlling some of the embodiments of the invention for micromachining a conical surface.

These and other embodiments, advantages and objects of the invention will be more apparent with reference with the following detailed description and attached drawings, a brief description of which is set out below.

DETAILED DESCRIPTION OF THE EMBODIMENTS

Figure 1:
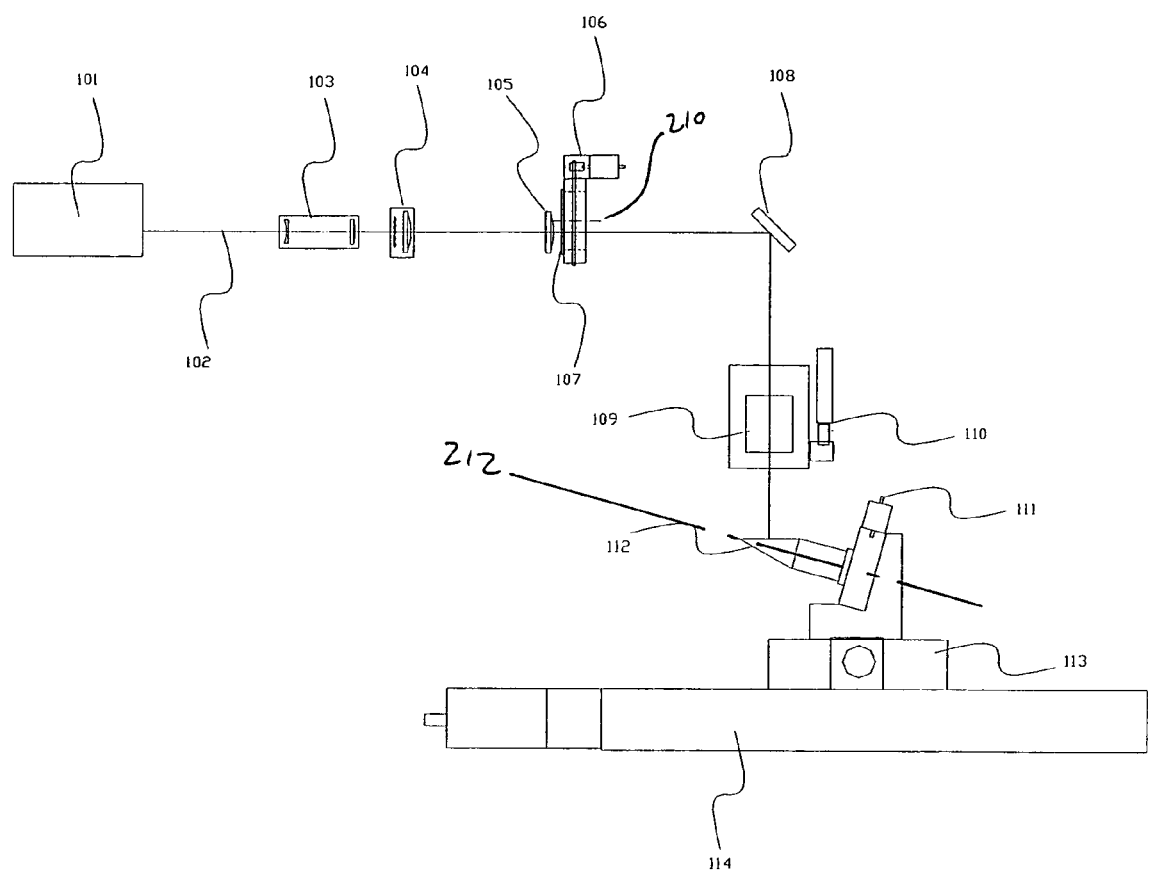
FIG. 1 is a schematic diagram of an optical system for imaging on a conical surface according to some embodiments of the present invention.

FIG. 1 illustrates one embodiment of a system 100 according to the present invention for imaging on a conical surface. As shown, a laser source 101 directs a laser beam 102 into a beam expander 103. After the beam expander, the resultant beam may be sent through a homogenizer and/or condenser lens(es) 104. The homogenizer may comprise those homogenizers as disclosed in co-owned and co-pending U.S. patent application publication No. 20040223330, entitled, "Methods and Apparatuses for Homogenizing Light", the entire disclosure of which is herein incorporated by reference.

Figure 2:
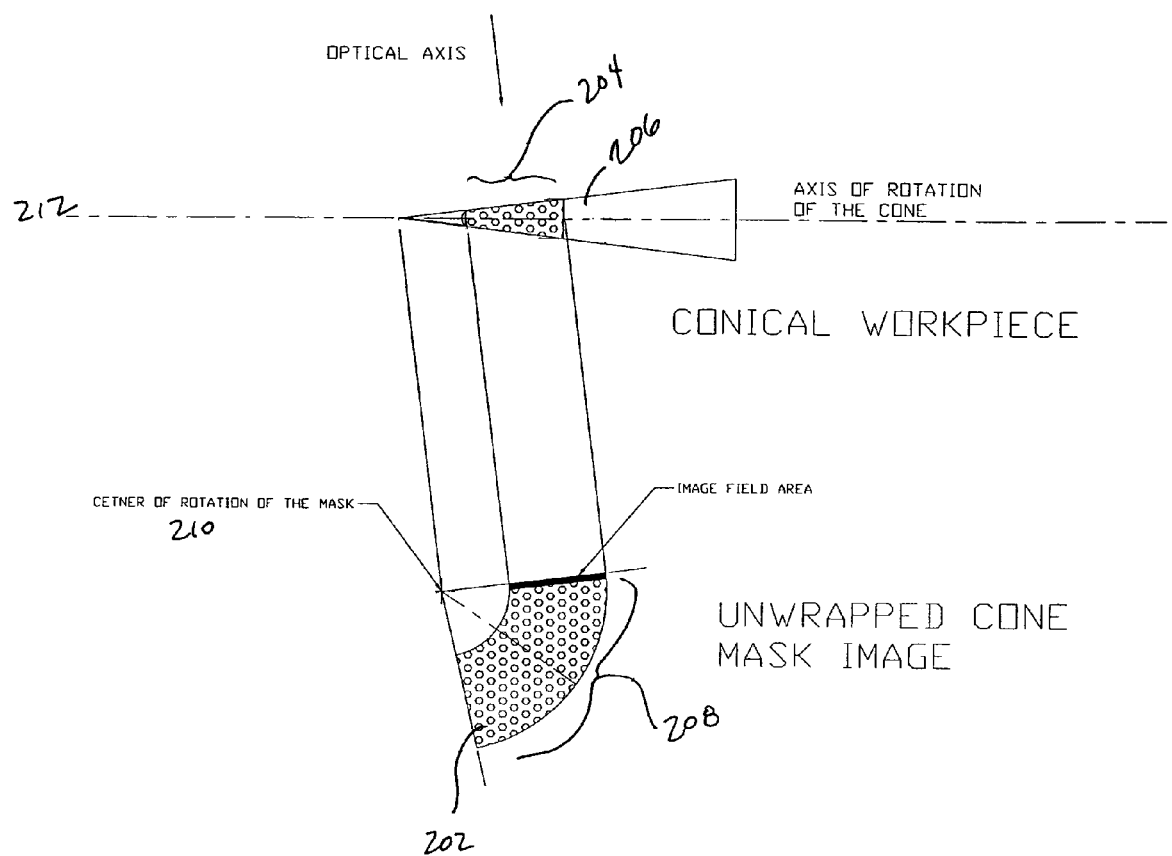
FIG. 2 is a schematic of the relationship between a planar mask and a conical workpiece according to some embodiments of the present invention.

A field lens 105 receives the homogenized/condensed beam, which collects the light for illuminating the mask 107. The mask pattern is preferably a representation of the unwrapped image 202 of a cone, which corresponds to a conical surface 204 of a cone 206 of a workpiece to be machined. As shown in FIG. 2, the unwrapped image 202 may be a planar surface that forms a sector 208 a ring.

While the present invention is illustrated with the use of a laser, other devices for generating a beam of electromagnetic energy (e.g., x-ray) may also be used with embodiments of the present invention.

The mask 107 is preferably positioned in an open aperture, motorized rotary device. The open aperture, motorized rotary device rotates mask 107 about a center of rotation 210 as shown in FIG. 2 (i.e., center of ring). As shown in FIG. 2, a laser field generated by optics of the system (i.e., beam expander 103, condenser lens 104 and field lens 105) may be projected onto the mask 107. The laser field is preferably a long-line field (i.e., a rectangular field), having short and long axes, but may comprise other shapes (e.g., elliptical, square, triangular, and other polygonal shapes). In long-line field embodiments, upon the long line field encountering the surface for machining, a short axis of the long-line field may be oriented substantially perpendicular (preferably perpendicular) to the conical workpiece axis (i.e., the vertex of the cone 206).

The long-line field projected onto the mask produces a long-line laser image field which is then directed, via turning mirror 108, onto projection lens 109. The projection lens then projects the long-line image field onto the workpiece, the focusing of which may be accomplished using adjuster device 110 (e.g., along a "Z" axis). In some embodiments, the turning mirror may be connected to at least one motor or other actuator(s) (e.g., piezo-based actuator) familiar to those of skill in the art, which may enable the mirror to pivot about one or more axes, to impart other directional control onto the beam. In other embodiments, the tuning mirror (as well as other components of the optical system) may not include motor(s)/actuator(s), and may be rigidly affixed in a single position after setup.

The focusing adjuster device 110 may comprise a motor (rotary or linear) (or other actuator device), which may move lens 109 along a single (preferably) axis (e.g., Z axis). Movement may be established via a rack and pinion gear arrangement, when using, for example, a rotary electric motor, or via direct connection of the lens or lens frame to the forcer or platen of a linear motor.

The laser image field produced by the projection of the laser light onto the mask, is then focused on the workpiece 112. Adjuster stages 113 and 114 may be provided (e.g., "X" and "Y" adjuster stages), and may be initially configured so that the laser image field is projected on the corresponding area of the workpiece prior to machining. One of skill of the art will appreciate that in some embodiments of the invention, the positions of adjusters 113 and 114 need not be adjusted once their positions are established during an initial setup. In such embodiments, the conical workpiece need only be rotated about an axis. As shown in FIG. 1, the axis of rotation of the conical workpiece (for example) is axis 112a.

Figure 3:
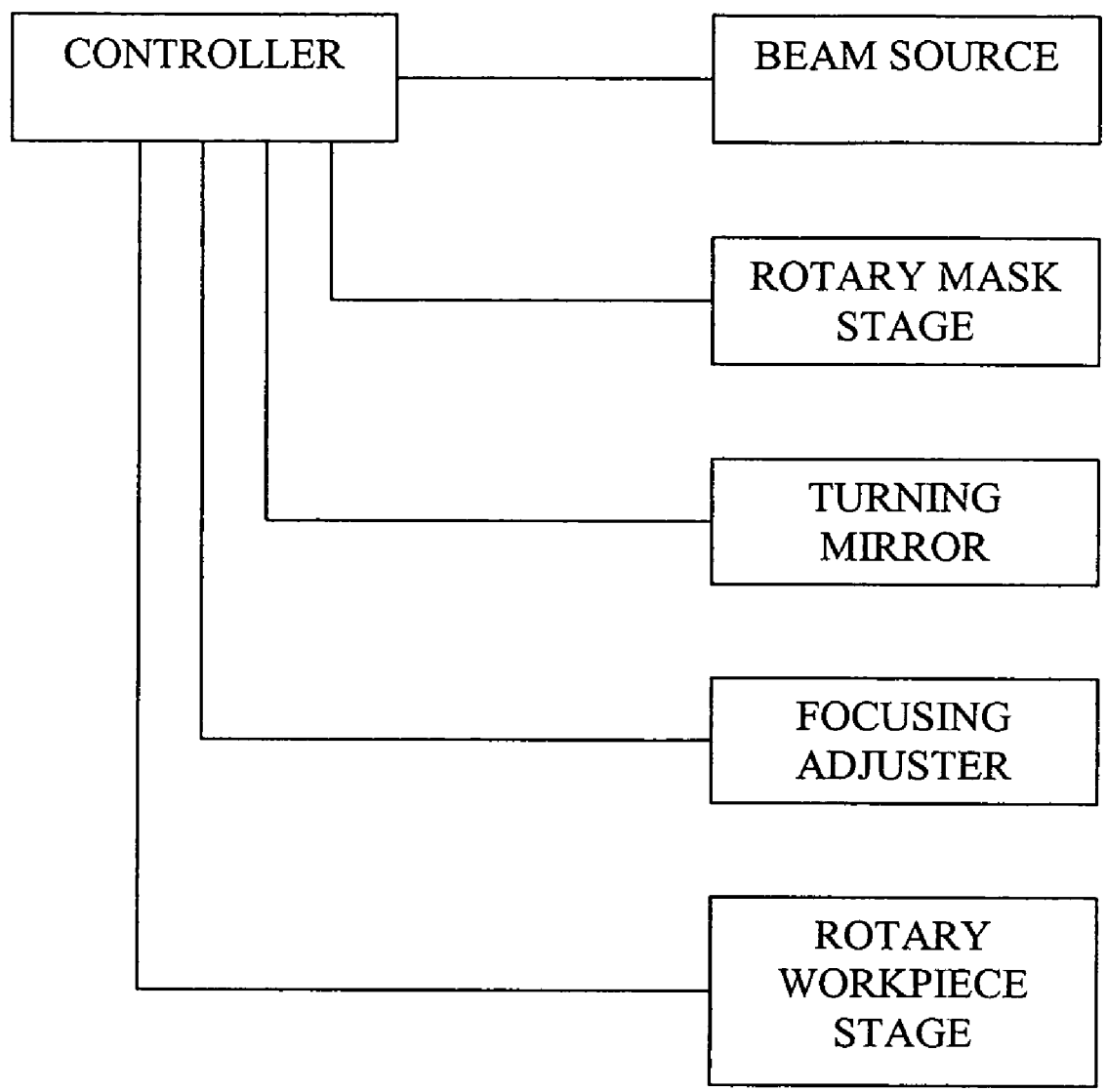
FIG. 3 is a block diagram of a laser micromachining system according to some of the embodiments of the invention.

FIG. 3 illustrates a block diagram of some of the embodiments of the present invention. As shown, a controller may be used to at least one of, setup, initiate, control and complete the laser micromachining of a workpiece. The controller may be an analog or digital control device, and is preferably a computer (e.g., personal computer operating an application program for controlling one or more of the components of system 100). For example, the controller may be connected (through either wireless or wired connection) to at least one of and preferably several of: the laser/beam source (e.g., power, intensity), and motors/actuators for: controlling beam expansion or consolidation devices (e.g., beam expander 103, homogenizer 104, condenser lenses, and the like), the open aperture-motorized rotary mask stage, the turning mirror 108, the focusing "Z" adjuster 110, the "X" adjuster stage 113, the "Y" adjuster stage 114 and the motorized rotary workpiece stage 111. In addition, position sensors may be positioned on all components and fed into the controller to provide (preferably) real-time feedback on the positions and/or status of the components of the system.

Accordingly, the system may be operable for micromachining a workpiece upon performing at least several (and preferably all) of the following:
 setup of a workpiece in the motorized workpiece stage 111;
 alignment of the adjuster stages 113, 114;
 positioning of turning mirror 108;
 positioning of the mask 107 with the open aperture-motorized rotary stage 106;
 positioning of on or more of: the laser beam 101, the beam expander 103, the homogenizer 104, condenser lenses and field lens(es); and
 focusing of the laser image field via focusing adjuster 110 such that the laser image field is projected onto a substantially correct corresponding portion of the conical surface of the workpiece for machining.

Accordingly, after initial setup, and after the light source is switched on, the mask may be rotated around axis 210 while synchronously rotating the conical workpiece around axis 212. By synchronously rotating the mask from one side of the ring sector to the other and rotating the cone around its axis 212, for a full rotation, the entire pattern of the mask may be imaged to the conical surface of the workpiece.

In some embodiments, the mask and the workpiece may be rotated in opposite directions since, in some embodiments, the projection lens inverts the image of the mask. Thus, if the mask is rotated clockwise, the conical workpiece is rotated counterclockwise (and visa-versa).

The homogenizer 104 may include a long line homogenizer to achieve uniform illumination (see U.S. published patent No. 20040223330). Although in some embodiments, the depth of focus of the imaging system and the curvature of the cone may limit the width of the line.

In some embodiments, the mask pattern may be purposely distorted with astigmatic distortion—i.e., different magnification in the X and Y directions along the conical axis to account for the variable radius along the conical surface. Alternatively, instead of creating the purposeful distortion on the mask, the optical/projection system may also create a similar astigmatic distortion to achieve the same result.

To that end, with regard to the above-noted embodiments, it is preferable that the long line of illumination include a narrow line—if the illumination line is too wide (according to some embodiments), the astigmatic distortion intentionally created by the mask or by the optics may blur the image on the workpiece. Thus, illuminating only a sufficiently narrow line effectively eliminates the effect of the astigmatism. For example, when machining a conical workpiece of about 25 mm in size, having conical surface of about 20 mm in length and having diameters of about 2 mm and about 10 mm, a width of a narrow line may be about 1 mm.

However, the mask and the workpiece in some embodiments may be imaged without astigmatism distortion. In such embodiments, the magnification values are preferably the same in both the X and Y directions. Therefore, when both the mask and the workpiece are rotated, the illumination line may be wider, and the illumination width is only limited by depth of focus on the curved surface. Thus, the process for these embodiments may be faster by rotating both the mask and the workpiece.

Having now described a few embodiments of the invention, it should be apparent to those skilled in the art that the foregoing is merely illustrative and not limiting, and it should be understood that numerous changes in creating and operating such systems and methods may be introduced without departing from the true spirit of the invention as defined in the appended claims.

What is claimed is:

1. A system for micromachining a conical surface comprising:
   a platform rotating about a first axis;
   a mask having a predetermined pattern comprising a sector of a planar ring corresponding to an unwrapped image of a conical surface of a workpiece, wherein:
      the mask being positioned on the platform such that the radial center of the sector is located on the first axis; and
      the sector having a width;
   a laser configured to project a long line of illumination onto the mask, the line of illumination including a short axis and a long axis, wherein the long axis is substantially equal to or greater than the width of the sector of the planar ring;
   a workpiece stage rotating the workpiece about a second axis, wherein the second axis corresponds to the rotational axis of the conical surface of the workpiece.

2. The system according to claim 1, further comprising an electromagnetic beam source for producing an electromagnetic beam.

3. The system according to claim 1, wherein the laser is an excimer laser.

4. The system according to claim 1, further comprising at least one of a beam expander, a beam homogenizer, one or more condenser lenses, one or more field lenses, a turning mirror and one or more projection lenses.

5. The system according to claim 1, wherein the platform includes an open aperture for receiving the long line of electromagnetic radiation.

6. The system according to claim 1, further comprising an imaging projection lens.

7. The system according to claim 6, wherein the projection lens includes a focusing mechanism.

8. The system according to claim 7, wherein the focusing mechanism comprises a rack and pinion.

9. The system according to claim 8, further comprising a motor or actuator for rotating the pinion to move the rack.

10. A method for imaging onto a conical surface of a workpiece, comprising:
    directing a long line of illumination at a mask, wherein
       the mask includes a planar surface of a sector of a ring and a predetermined image thereon,
       the ring sector corresponds to an unwrapped area of a conical surface of a workpiece and includes a width; and
       the long line of illumination includes a short axis and a long axis, wherein the short axis is substantially equal to or greater than the width of the ring sector;
    producing, as a result of the long line of illumination interacting with the mask, an image field projecting on a conical surface of the workpiece;
    projecting the image field onto the conical surface of the workpiece;
    rotating the mask about a first axis, wherein the first axis comprises the radial center of the sector of the planar ring;
    synchronously rotating the workpiece about a second axis, the second axis corresponding to the axis of rotation of the conical surface of the workpiece.

11. The method according to claim 10, wherein the short axis is oriented perpendicular to the second axis.

12. The method according to claim 10, wherein the workpiece is tilted with respect with the beam, such that the beam is substantially normally incident to the conical surface of the workpiece.

13. The method according to claim 10, wherein the long line of illumination is produced by a laser.

14. The method according to claim 11, wherein the laser comprises an excimer laser.

15. The method according to claim 10, wherein the mask comprises a magnified image of the conical surface.

16. The method according to claim 10, wherein the mask and the conical surface are rotated in opposite directions.

17. A system for micromachining a conical surface comprising:
    a workpiece stage having a rotational axis for rotating a removably-affixed workpiece comprising a conical surface, wherein the rotational axis corresponds to the rotational axis of the conical surface,
    a rotating platform for receiving a long line of laser illumination, the platform having a first axis of rotation;
    a mask having a predetermined pattern comprising a sector of a planar ring, wherein the sector comprises an unwrapped image of the conical surface, the mask being positioned on the rotating platform such that the radial center of the sector corresponds to the first axis of rotation, and wherein the sector includes a width;
    an excimer laser configured to project a long line of illumination onto the mask, the line of illumination including a short axis and a long axis, wherein the long axis is substantially equal to or greater than the width of the sector;
    a homogenizer for homogenizing the laser beam in at least a single direction;
    at least one condenser lens;
    a turning mirror; and
    at least one projection lens.

18. A method for enabling a computer to control equipment for imaging a conical surface of a workpiece stored on a non-transitory computer readable medium, the method comprising:
    directing a long line of illumination at a mask, wherein
       the mask includes a planar surface of a sector of a ring and a predetermined image thereon, the ring sector corresponds to an unwrapped area of a conical surface of a workpiece and the sector includes a width;
       the long line of illumination includes a short axis and a long axis; and
       the long axis is substantially equal to or greater than the width of the sector;
    producing, as a result of the long line of illumination interacting with the mask, an image field for projection on the conical surface of the workpiece;
    projecting the image field onto the conical surface of the workpiece;
    rotating the mask about an axis, wherein the axis comprises the center of the ring;
    synchronously rotating the workpiece about a second axis, the second axis corresponding to the rotational axis of the conical surface of the workpiece.

* * * * *